March 2, 1926.   1,575,148

M. CARBONE

PROCESS OF PACKING AND PRESERVING FRUIT

Filed Feb. 14, 1924   3 Sheets-Sheet 1

INVENTOR.
MARIO CARBONE
BY
ATTORNEY.

March 2, 1926.                                              1,575,148
                      M. CARBONE
            PROCESS OF PACKING AND PRESERVING FRUIT
                Filed Feb. 14, 1924        3 Sheets-Sheet 2
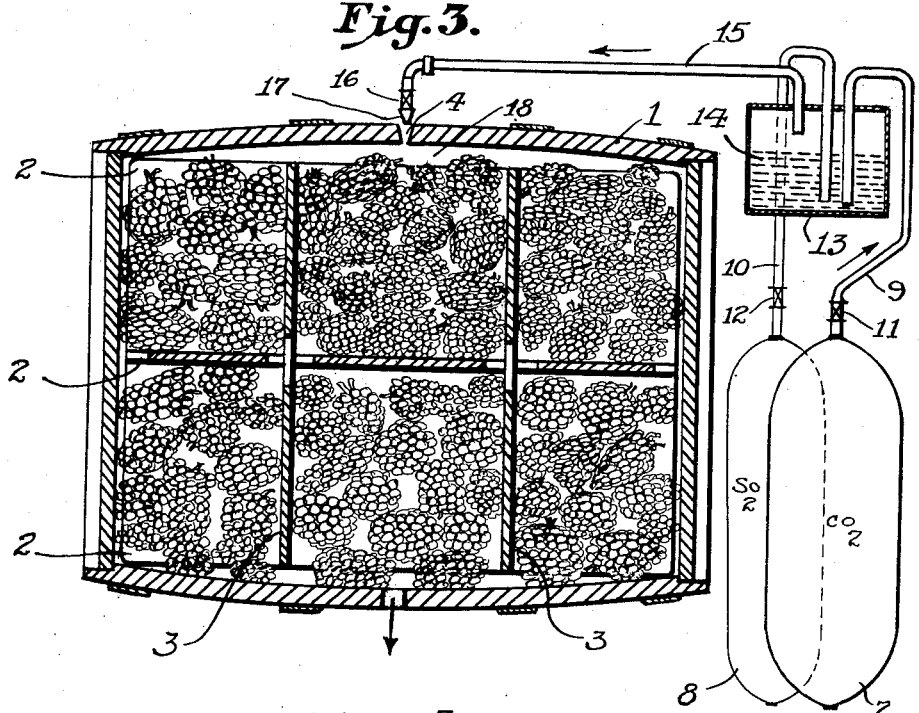
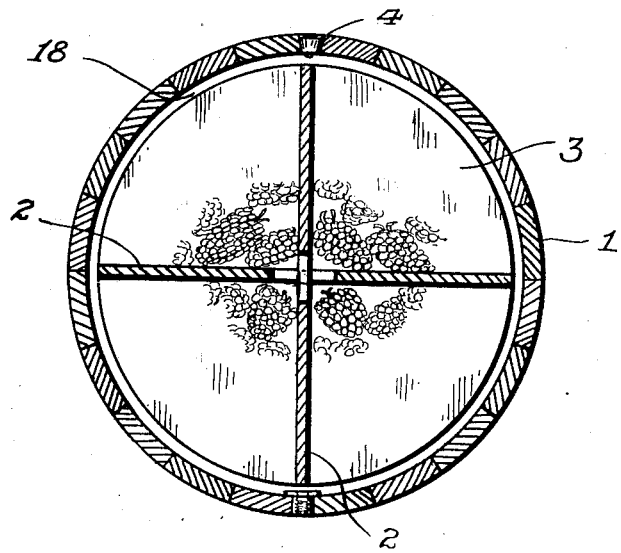
INVENTOR.
MARIO CARBONE
BY
ATTORNEY.

March 2, 1926.

M. CARBONE 1,575,148

PROCESS OF PACKING AND PRESERVING FRUIT

Filed Feb. 14, 1924    3 Sheets-Sheet 3

INVENTOR
MARIO CARBONE
ATTORNEY

Patented Mar. 2, 1926.

1,575,148

UNITED STATES PATENT OFFICE.

MARIO CARBONE, OF NEW YORK, N. Y.

PROCESS OF PACKING AND PRESERVING FRUIT.

Application filed February 14, 1924. Serial No. 692,746.

*To all whom it may concern:*

Be it known that I, MARIO CARBONE, residing at New York, in the county and State of New York, have invented certain new and useful Improvements in a Process of Packing and Preserving Fruit, of which the following is a specification.

This invention relates to a process for the preservation of certain deciduous fruits, said invention contemplating certain improvements over the invention disclosed in my co-pending application Serial Number 654,312.

One of the objects of the invention is to provide a new and improved and practical process, whereby certain fruits, such for instance as grapes, may be treated, packed and shipped, whereby they will be preserved indefinitely without danger of decay, fermentation, or other chemical change.

Another object of the invention is to eliminate the use of ice in shipment of fruit, such as grapes, and also the elimination of the expensive processes of refrigeration now required in the shipment of fruit, such as grapes.

At this point it may be noted that hitherto great losses have resulted in the shipment of certain fruits, from decay, fermentation, or other chemical changes, during transportation of the fruit from the places of production to the places of utilization or consumption, due to the fact that unless the fruit is kept in a refrigerated condition, either by the use of ice or artificial refrigeration, very quickly, due to the bacteria present, the fruit begins to deteriorate, being oftimes entirely destroyed before reaching its destination. In certain seasons of the year it has been impossible to ship fruits, such for instance as grapes, from the Pacific coast to the Atlantic seaboard, or even parts of the United States less remote, from the source of production. Moreover, it has been practically impossible to ship grapes, unless refrigerated, from production centres in Europe to the United States.

It is highly desirable that in any treatment of the fruit for preservation purposes, the process be inexpensively carried on, be practical, and that while harmful life forms be destroyed, the quality or flavor of the fruit be not affected, or the fruit rendered unhealthful.

Other objects and aims of the invention, more or less specific than those referred to above, will be in part obvious and in part pointed out in the course of the following description of the steps and the relation of each step to one or more of the others thereof employed in carrying out my process, and the scope of protection contemplated will be indicated in the appended claims.

Referring now to the drawings, wherein I have illustrated schematically two preferred forms of carrying out my improved process:

Figure 3 is a view partly in longitudinal section, and partly in elevation, showing an apparatus which may be employed to carry out another embodiment of my invention.

Figure 4 is a transverse sectional view of the container shown in Fig. 3.

Figure 1:
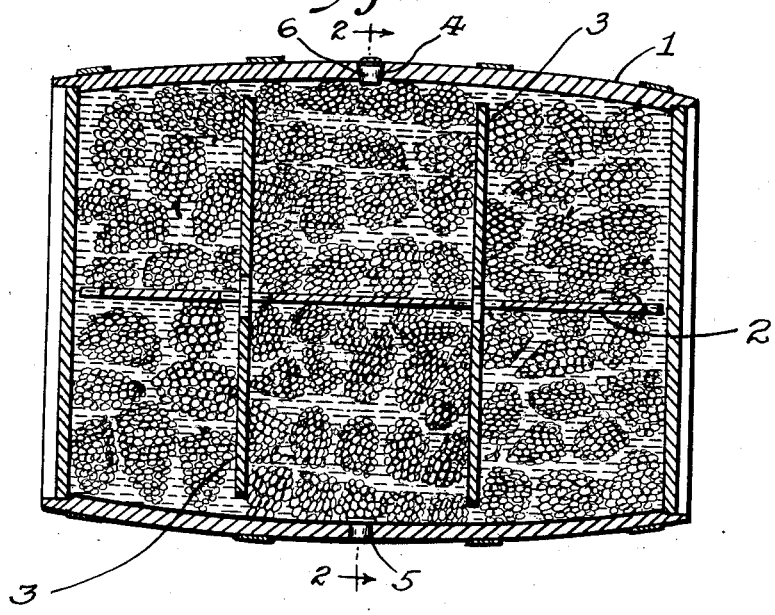
Figure 1 is a longitudinal sectional view taken through a container, in which have been packed a quantity of grapes, in accordance with one embodiment of my process.
Figure 2:
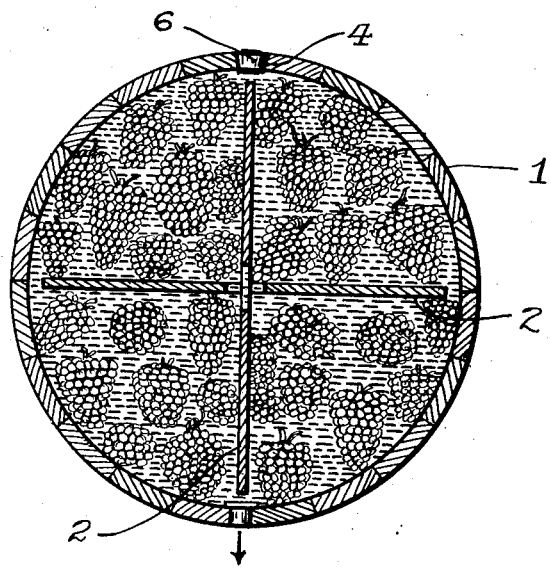
Figure 2 is a vertical sectional view taken through said container, on line 2—2 of Fig. 1.

Referring now to the drawings, wherein similar reference characters refer to similar parts throughout the several views thereof, and referring particularly to Figs. 1 and 2, the reference numeral 1 denotes a container, which in the present instance takes on the form of a barrel or hogshead, it being understood that this container is air tight and waterproof.

I prefer to divide the container into a plurality of compartments, so that the fruit will not be mashed or crushed during shipment by its own weight. Such compartments may be readily formed by the longitudinally extending partition 2 and the transversely extending partitions 3. These partitions are made of detachable boards, whereby the compartments may be formed as the grapes are packed in the container.

The container has the bung-holes 4 and 5, which may be closed by the usual bungs, one of which is shown at 6.

Having provided the container, and packed the same full of fruit, the container is then headed. I next provide a quantity of the juice, preferably of the fruit, with which the container has been filled. This juice is then treated either with sulphurous acid gas, potassium metabisulphide, or pyrosulphide of potassium, or any other sterilizing agent or gas, whereby the fruit juice is itself sterilized, and put in such condition that it will act as a sterilizing medium to the fruit which is to be immersed therein, or otherwise brought in contact therewith.

While I preferably employ as a sterilizing agent or the juice of the fruit which is to be packed and shipped, I wish it to be distinctly understood that I do not limit myself to the use of such juice as I may employ instead of such juice water, or a solution of sugar and water, wine, or other suitable sterilizer in the manner above stated.

Having provided the sterilizing liquid, the container, such as shown in Fig. 1, is positioned with the bung-hole 4 in its uppermost position, the bung-hole 5 being closed, and the sterilizing liquid poured into the barrel through said bung-hole 4 by means of a funnel or other suitable means, so that the air confined in the container will pass upwardly out of said bung-hole 4. When the container has been completely filled with the sterilizing liquid, the bung 6 is inserted in the bung-hole 4, whereby the container is closed. Thus all the air contained in the barrel will be expelled by the sterilizing liquid, and all parts of the cluster, or surfaces of the fruit, will be immersed in the sterilizing liquid. The packed fruit is then in condition to be shipped, and will be preserved indefinitely in the condition in which it was before packing.

Referring now to the embodiment of my invention illustrated in Figs. 1 to 6, and particularly to Figs. 3 and 4, a container, such as has already been described, is provided, said container having the bung-holes 4 and 5. The fruit shown in the drawings as consisting of grapes, is packed in the compartments in the manner above described, and the container headed. The container is then filled with a sterilizing liquid, such as has been described in the first mentioned embodiment of my invention, so that all the air present in the container when the fruit was packed, has been expelled.

The container is then set in the position shown in Figs. 3 and 4, and the fruit treated in the manner which will presently be described. The reference numeral 7 indicates a tank which may contain a sterilizing gas, such for instance as carbonic acid gas ($CO_2$), and the reference numeral 8 indicates a similar tank which may contain a sterilizing gas of another character, such for instance as sulphurous acid gas ($SO_2$). While I have indicated these tanks as being charged with carbonic acid gas, and sulphurous acid gases, it will be understood that other sterilizing gases may be employed, such for instance as the gases mentioned in the first described embodiment of my invention, or a mixture of such gases.

These tanks are connected by conduits 9 and 10, valved as at 11 and 12 to a tank 13, containing liquid seal 14, the conduits discharging the gas beneath the surface of the liquid. The reference numeral 15 denotes a conduit which leads from the tank 13 to a position adjacent the container 1, said conduit which is valved as at 16, being provided with a nozzle 17 adapted tightly to fit in the bung-hole 4 of the container 1.

With the parts thus positioned, the bung-hole 5 is opened, and the liquid in the container 1 is allowed to discharge into a suitable tank or vat. The valves 11 and 12, or either of them, are opened, permitting either gas, or a mixture of the two, to pass through conduits 9 or 10, through the liquid seal, whence the gas is discharged from the conduit 15, through the nozzle 17 into the container 1.

Thus the space formerly occupied by the liquid within the container 1 as it flows from the container will be occupied by the sterilizing gas. When the container has been completely discharged of its liquid content, and has been filled by the sterilizing gas, both bung-holes 4 and 5 are plugged, whereupon the fruit is ready for shipment. If desired, when the liquid content has been entirely discharged from the container 1, the bung-hole 5 may be closed, and a sufficient quantity of gas discharged into the container, as will establish a pressure within the container. This operation can be effected by providing a check valve on the bung 6, the bung itself being closed by a plug, such as disclosed in my aforementioned co-pending application.

Figure 5:
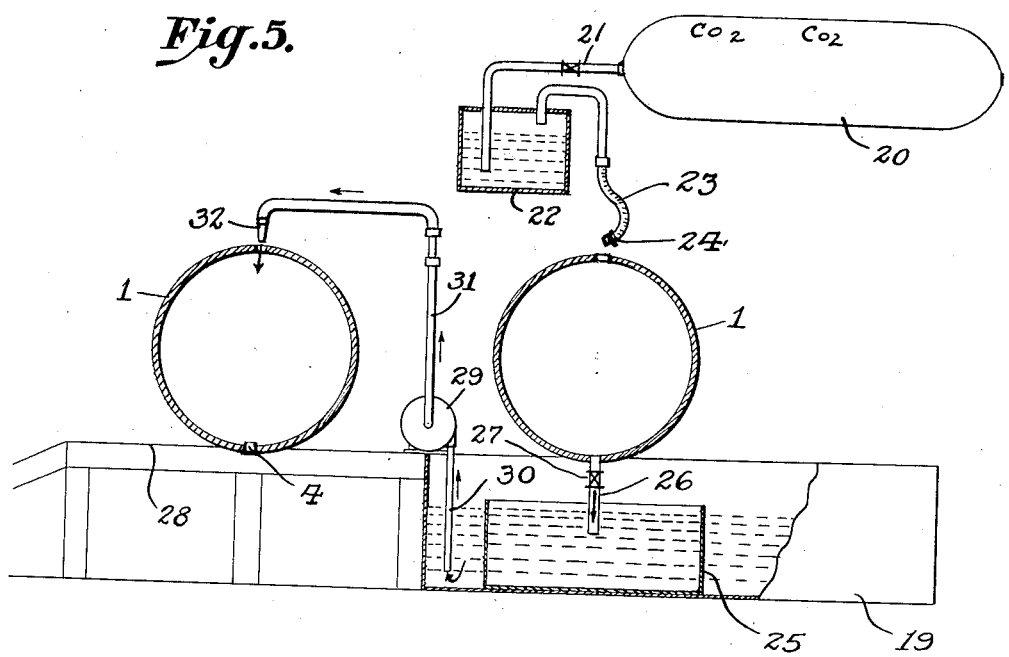
Figure 5 is a sectional view, showing a practical method of carrying out the several steps of the process in the embodiment of my invention shown in Figures 3 and 4.
Figure 6:
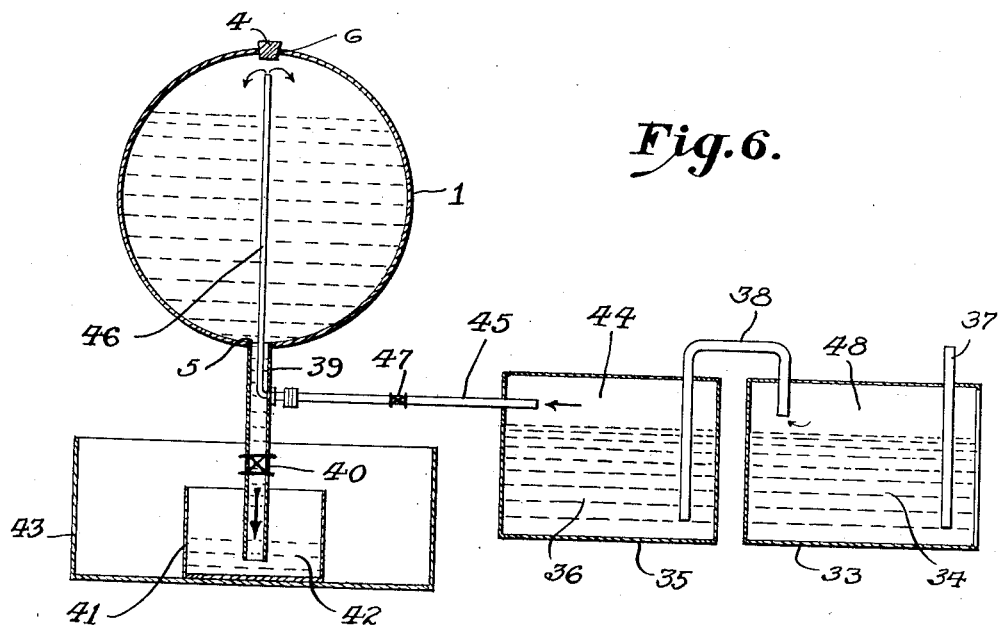
Figure 6 is a similar view showing a slightly modified way of carrying out the process of the last mentioned embodiment of my invention.

Referring now to Figs. 5 and 6 of the drawings, I have illustrated therein two preferred forms of apparatus, wherein my improved process may be carried out in a practical commercial manner. Referring now paticularly to Figure 5, the reference numeral 19 denotes a trough or tank along the lateral edges of which the containers or barrels may be rolled.

The reference numeral 20 indicates a tank which may contain a quantity of any one of the aforementioned sterilizing gases under pressure, or a mixture of such gases. The gas is discharged through a conduit 21, through a liquid seal 22, through a flexible conduit or hose 23, to which is attached at its free end the nozzle 24. The container 1, which as above described, has been packed with fruit, headed and filled with a sterilizing liquid, in accordance with the aforementioned disclosure, is rolled on the trough or vat 19 to the position shown at the righthand side of Figure 5.

25 indicates an open-ended container which may rest upon the bottom wall of the vat 19. A pipe or hose 26, valved as at 27, is inserted in the bung-hole 5, so as to discharge in the open-ended container 25, beneath the surface of the liquid in said container, so as to provide a liquid seal. The valve 27 is then opened to permit the liquid in the container 1 to be discharged into the open-ended container 25, whereby the contents of the container will flow first into the container 25, which overflowing, will discharge the liquid into the vat 19.

When the liquid is discharging, the gas or mixture of gases from the tank 20, will be discharging through the conduit 21, and associated conduits, and nozzle 24, into the container 1, assuming that the nozzle 24 has been tightly fitted into the bung-hole 4 before the operation started, as has already been described.

Referring now to the lefthand side of Figure 5 of the drawings, there is shown a skid 28, from which a second container 1 has been rolled. This container has its bung-hole 5 at the top, and the bung-hole 4 in its lowermost position. The bung-hole 4 is then closed. The reference numeral 29 indicates a pump, having a feed conduit 30 leading to a position adjacent the bottom of the tank 19, and a discharge conduit 31 provided with a nozzle 32, loosely fitting in the bung-hole 5.

With the parts in this position, the pump 29 is started, whereupon the liquid in the tank 19 is pumped into the container 1. When this operation has been completed, the valved pipe or conduit 26 is inserted in the bung-hole 5, the valve 27 being closed. The container is then rolled to an angle of 180°, whereupon it assumes the position of the container shown at the righthand side of the figure.

The operation of discharging the liquid, and filling the container with the sterilizing gas is then repeated in the manner above described. It will be seen that this operation continues, the sterilizing liquid being used over and over, the waste being replenished as often as required.

In the event that a supply of sterilizing gases in pressure tanks is not available, I have shown in Figure 6 of the drawings, a method of providing a sterilizing gas, which may be provided without the use of the sterilizing gas containers, such as are employed in the above described embodiments of my invention.

Referring now to Figure 6, the reference numeral 33 denotes a tank or vat in which is contained a quantity of liquid which has been thoroughly impregnated preferably with a metabisulphide solution, either in the juice in which the fruit is to be packed, or in water. While I prefer to use a salt, such as metabisulphide of potassium, other sterilizing salts or agents may be employed to charge or impregnate the solution 34 to the tank 33. The reference numeral 35 indicates a second tank, having a similar or different sterilizing solution 36 contained therein.

It will be understood, of course, that one or a plurality of tanks similar to tanks 33 and 35 may be provided, whereby either a single solution or a mixture of sterilizing gases may be obtained. The provision of a plurality of tanks also is of assistance in more thoroughly impregnating the gas to be utilized in the carrying out of this embodiment of my process.

The conduit 37 leads from the open air to a position beneath the liquid 34 in the tank 33, a conduit 38 extends from the gas space in the tank 33, to a position beneath the surface of the solution 36 in the tank 35.

Assuming the container 1 to have been filled with a sterilizing liquid in the manner above set forth in connection with the first described embodiments of my invention, with the bung-hole 4 in the uppermost position, and closed by the bung 6, the conduit 39, valved as at 40, is inserted in the bung-hole 5, said conduit leading into an open-ended container 41, and beneath a liquid seal 42 contained therein. The container 41 is preferably rested upon the bottom of a tank or vat 43, such as has already been described.

Leading from the gas space 44 in the tank 35 is a conduit 45, which extends through and is sealed in the wall of the conduit 39. This conduit 45 has an upward open-ended extension 46, which extends upwardly through the conduit 39 to a position adjacent the uppermost part of the container 1, preferably directly beneath the bung 6. The conduit 45 is preferably valved as at 47. With the parts in this position, the valves 40 and 47 are open, whereupon the liquid from the container 1 will fall by gravity to be discharged through the conduit 39 into the open end of the container 41, where overflowing, it will be discharged into the tank 43. This operation will cause a partial vacuum to occur in the upper portion of the container 1, such operation producing a suction through the conduit 46, conduit 45, and likewise produce a partial vacuum in the gas space 44, whereupon the suction produced in this gas space through the conduit 38 will produce a partial vacuum in the gas space 48 of the tank 33. This partial vacuum will cause air to be drawn from the conduit 37 through the saturated sterilizing solution 34 in the tank 32, and likewise through the saturated sterilizing solution 36, and the tank 25, whereby the air passing through these saturated solutions, or one of them, will be impregnated with the respective gases with which the solutions are charged or saturated. This impregnated gas will then be discharged through the conduits 45 and 46 into the container 1, and will fill the space vacated by the discharging liquid into the container 1.

When the entire liquid content of the container 1 has been discharged through the conduit 39, said container will have been filled with a sterilizing gas.

It will accordingly be seen that I have provided a process well adapted to attain, among others, all the ends and objects above pointed out, in a simple yet efficient manner. The sterilizing liquids and gases not only sterilize the inner walls of the container, but kills the bacteria present in the fruit. Inasmuch as the fruit is thereafter confined in the container without the presence of air or oxygen, there is no opportunity for bacteria to develop in or upon the fruit. Fruit, such as grapes, packed in the above manner, may be preserved in the container for an indefinite period of time, affording an efficient, practical, and economical means whereby fruit such for instance as grapes, may be packed and shipped from producing centres to places of consumption and utilization at remote distances therefrom. The provision of the separate compartments for the fruit within the shipping vessel prevents the mashing or marring of the fruit during shipment, and also provides means whereby the fruit may be more thoroughly subjected to the action of the sterilizing mediums.

As many changes could be made in this construction without departing from the scope of the following claims, it is intended that all matter contained in the above description or shown in the accompanying drawing shall be interpreted as illustrative only and not in a limiting sense.

Having thus described my invention what I claim as new and desire to secure by Letters Patent is:

1. The herein described process of packing fruit, which consists in providing a suitable container, packing said container with fruit, filling said container with juice of fruit of the same type or kind as the fruit under treatment, said juice being impregnated with a sterilizing agent, and then sealing said container.

2. The herein described process of packing fruit, which consists in providing a suitable container, packing said container with fruit, providing a quantity of juice of fruit of the same type or kind which has been packed in said container, impregnating said juice with a sterilizing agent, filling said container with said impregnated juice, and then sealing said container.

3. The herein described process of packing fruit, which consists in providing a suitable container, packing said container with fruit, filling said container with juice of fruit of the same type or kind of the fruit under treatment, which has been rendered sterile by the addition of a sterilizing agent such as potassium metabisulphide, or sulphurous acid.

4. The herein described process of packing fruit, which consists in providing a suitable container, packing said container with fruit, providing a sufficient quantity of liquid impregnated with a sterilizing agent to fill said container with the fruit therein, projecting said liquid into said container, discharging said liquid from said container, and simultaneously filling said container with a sterilizing agent, and then sealing said container.

5. The herein described process of packing fruit, which consists in providing a suitable container, packing the fruit in said container, washing the fruit in said container with a sterilizing liquid, filling said container with a sterilizing agent, and then sealing said container.

6. The herein described process of preserving fruit, which consists in providing a suitable container, packing the fruit therein, filling said container with a liquid impregnated with a sterilizing agent, discharging the liquid from said container, and simultaneously filling said container with a sterilizing fluid.

7. The herein described process of preserving fruit, such as grapes, which consists in providing a suitable container, packing the fruit within said container, filling said container with a fruit juice impregnated with a sterilizing agent, discharging said fruit juice from said container, and at the same time filling said container with a sterilizing fluid, and then sealing said container.

8. The herein described process of preserving fruit, such as grapes, which consists in providing a suitable container, packing the fruit within said container, filling said container with a fruit juice impregnated with a sterilizing agent, discharging said fruit juice from said container, and at the same time filling said container with a sterilized juice of the fruit of the same type or kind that is packed in said container, and sealing said container.

In testimony whereof, I affix my signature.

M. CARBONE.